June 26, 1956 F. A. BAKER 2,752,560

MAGNETIC AMPLIFIERS

Filed April 18, 1955 2 Sheets-Sheet 1

WITNESSES:

E. A. McCloskey

K. W. Thomas

INVENTOR

Floyd A. Baker.

BY

Ezra W. Savage

ATTORNEY

United States Patent Office 2,752,560

Patented June 26, 1956

2,752,560

MAGNETIC AMPLIFIERS

Floyd A. Baker, Los Angeles, Calif., assignor to Westinghouse Electric Corporation, East Pittsburgh, Pa., a corporation of Pennsylvania Application April 18, 1955, Serial No. 502,103

8 Claims. (Cl. 323—89)

This invention relates to magnetic amplifiers, and more particularly, to means for minimizing the effect of induced voltage in the control circuit of an alternating-current controlled magnetic amplifier.

In an alternating-current controlled magnetic amplifier the voltages induced across the alternating-current control windings during operation aid one another and thus effect a circulating current in the control circuit. In operation, this circulating current in the control circuit is produced by the current flow through the main or load windings of the magnetic amplifier. Thus, as long as such a circulating current exists, the magnetic amplifier cannot be cut off.

One method of reducing the circulating current in the control circuit of an alternating-current control magnetic amplifier is to increase the resistance in the control circuit. However, an increase in the resistance in the control circuit decreases the gain of the magnetic amplifier.

An object of this invention is to provide for minimizing the effect of the induced voltage in the control circuit of an alternating-current controlled magnetic amplifier, to thereby enable the provision of low resistance in the control circuit, to thus provide a maximum of gain for the magnetic amplifier.

A specific object of this invention is to provide for bucking out voltage induced in the control circuit of an alternating-current controlled magnetic amplifier, to thereby enable the provision of low resistance in the control circuit and thus provide a maximum gain for the magnetic amplifier.

Another object of this invention is to provide for preventing the circulation of current in the control circuit of an alternating-current controlled magnetic amplifier due to induction, so that the load windings of the magnetic amplifier do not have to effect a supply of this circulating current, thus permitting the magnetic amplifier to be cut off.

Other objects of this invention will become apparent from the following description when taken in conjunction with the accompanying drawings, in which.

Figure 1:
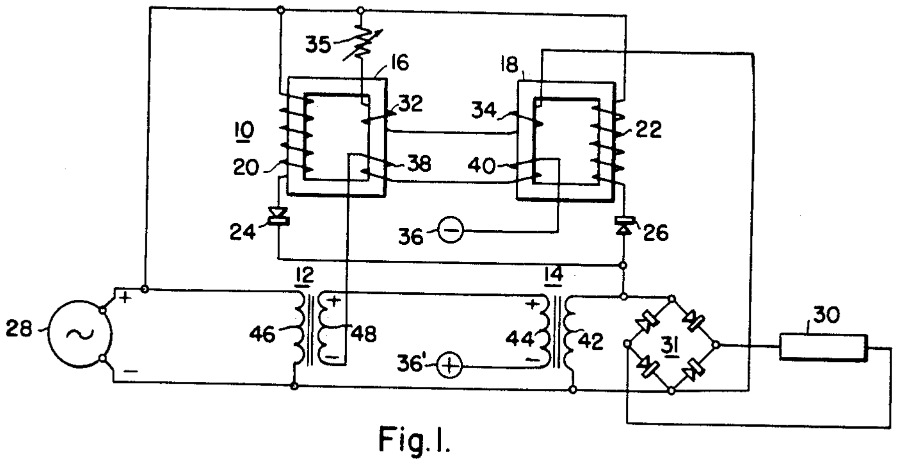
Figure 1 is a schematic diagram of circuits and apparatus illustrating the application of this invention to a single-ended doubler-type magnetic amplifier.

Referring to Fig. 1, this invention is illustrated by reference to a single-ended doubler-type magnetic amplifier 10. In accordance with the teaching of this invention, electrical devices, specifically potential transformers 12 and 14, are provided and so interconnected with the remaining components of the magnetic amplifier 10 as to buck out the voltages induced in the control circuit of the magnetic amplifier 10. Such an action provides a maximum of gain for the magnetic amplifier 10 and permits the magnetic amplifier 10 to be cut off.

In this instance, the magnetic amplifier 10 comprises magnetic core means, specifically magnetic core members 16 and 18 which have disposed in inductive relationship therewith load windings 20 and 22, respectively. In order to produce self-saturation for the magnetic amplifier 10 self-saturating rectifiers 24 and 26 are conencted in series circuit relationship with the load windings 20 and 22, respectively.

In operation, the load windings 20 and 22 are energized in accordance with the output of an alternating-current source 28. Specifically, the load windings 20 and 22 and their associated self-saturating rectifiers are so interconnected with a load 30 and with the alternating-current source 28 that the load windings 20 and 22 are alternately energized.

For the purpose of producing a direct-current voltage across the load 30, a full-wave dry-type rectifier 31 is provided. In particular, one of the input terminals of the rectifier 31 is connected to the output of the alternating-current source 28 and the other input terminal of the rectifier 31 is connected to the junction point of the self-saturating rectifiers 24 and 26. As illustrated, the load 30 is connected across the output terminals of the rectifier 31.

In order to bias the magnetic core members 16 and 18 a predetermined amount, bias windings 32 and 34 are disposed in inductive relationship with the magnetic core members 16 and 18, respectively. In practice, the bias windings 32 and 34 are so disposed on their respective magnetic core members 16 and 18 that when no current is flowing through the associated load windings 20 and 22, respectively, the current flow through the bias windings 32 and 34 effects a magnetomotive force which drives the particular magnetic core member away from positive saturation.

The bias windings 32 and 34 are connected to be responsive to the alternating-current source 28. Specifically, the bias windings 32 and 34 are connected in series circuit relationship with one another and with an adjustable resistor 35, the series circuit being connected to the alternating-current source 28. The function of the adjustable resistor 35 is to vary the amount of bias effected by the bias windings 32 and 34.

In order to reset the flux lever in the magnetic core members 16 and 18 to a level in accordance with the magnitude of an amplitude modulated alternating voltage applied to terminals 36 and 36′, alternating-current control windings 38 and 40 are disposed in inductive relationship with the magnetic core members 16 and 18, respectively. In practice, the alternating-current control windings 38 and 40 are so disposed on their respective magnetic core members 16 and 18 that current flow therethrough produced magnetomotive forces which opposed the magnetic forces produced by the current flow through the associated bias windings 32 and 34, respectively.

In accordance with the teaching of this invention, the potential transformer 14, which comprises a primary winding 42, and a secondary winding 44, is connected to be responsive to the current flow through the pair of load windings 20 and 22 of the magnetic amplifier 10. In particular, the primary winding 42 of the transformer 14 is connected between one side of the output of the alternating-current source 28 and the junction point of the self-saturating rectifiers 24 and 26; the junction point of the load windings 20 and 22 being connected to the other side of the alternating-current source 28.

Further, in accordance with the teaching of this invention, the potential transformer 12, which comprises a primary winding 46 and a secondary winding 48, is connected to be responsive to the output of the alternating-current source 28. In particular, the primary winding 46 of the transformer 12 is connected across the output of the source 28. Likewise, in accordance with this invention the secondary windings 44 and 48 of the transformers 14 and 12, respectively, are connected in series circuit relationship with one another and in series circuit relationship with the alternating-current control windings 38 and 40 so that the voltages produced across the secondary windings 44 and 48 can buck out the voltages induced across the alternating-current control windings 38 and 40 during the operation of the magnetic amplifier 10. The hereinbefore described series circuit is connected to the terminals 36 and 36′ so as to render the alternating-current control windings 38 and 40 responsive to the alternating control voltage applied to the terminals 36 and 36′. In practice, the alternating voltage applied to the terminals 36 and 36′ is of the same frequency and phase as the output voltage of the alternating-current source 28.

Figures 3, 4, 5:
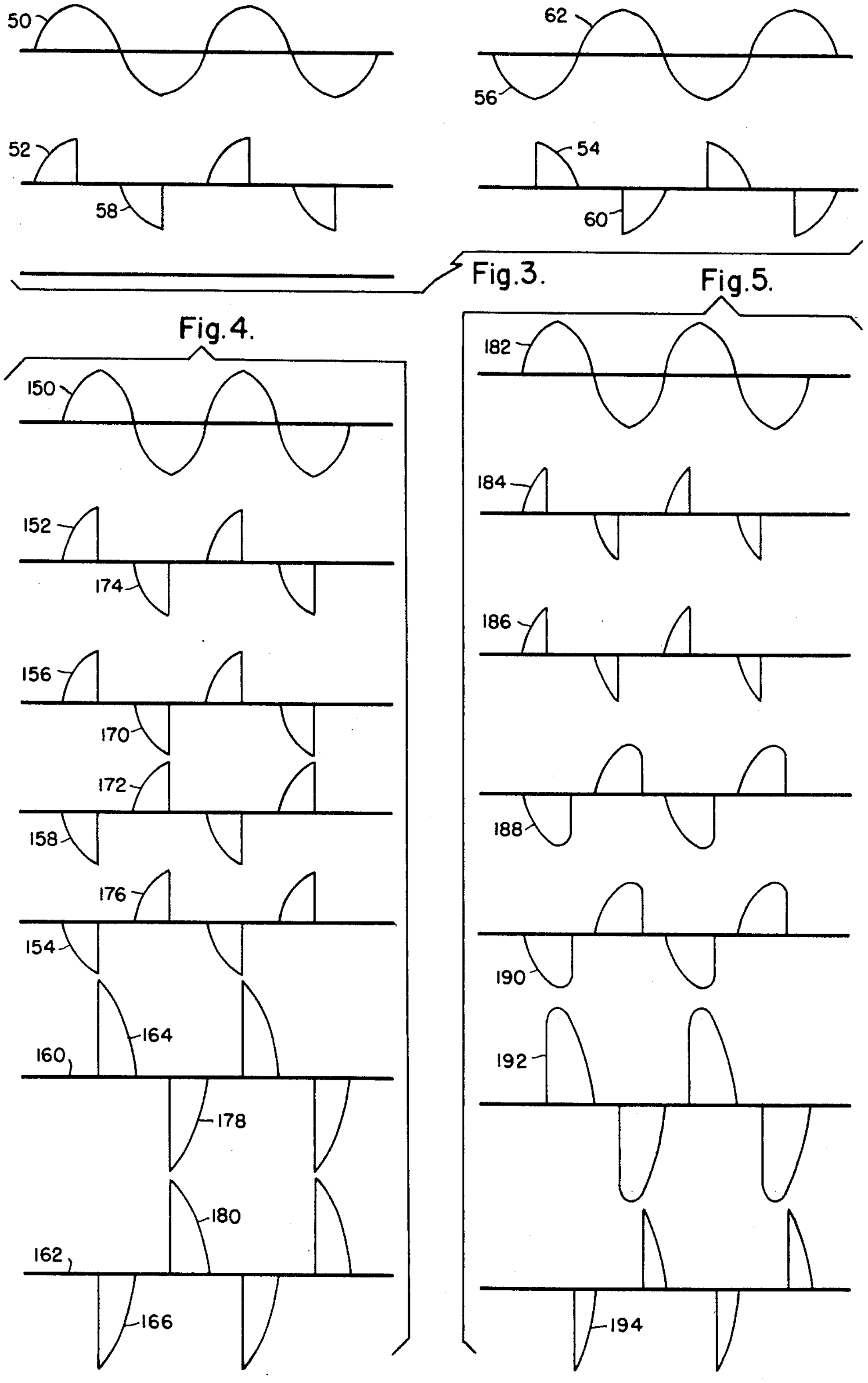
Fig. 3 is a graph illustrating the operation of the apparatus shown in Fig. 1.
Fig. 4 is a graph illustrating the operation of the apparatus shown in Fig. 2 when the alternating-current control signal is of zero magnitude.
Fig. 5 is a graph illustrating the operation of the apparatus of Fig. 2 when an alternating-current control signal of a predetermined magnitude and of a polarity as shown in Fig. 2 is applied to the magnetic amplifier.

The operation of the apparatus illustrated in Fig. 1 can be better understood by referring to the graph illustrated in Fig. 3 in which sine wave 50 represents the output voltage of the alternating-current source 28. Assuming the polarity of the alternating voltage applied to the terminals 36 and 36′ and the polarity of the source 28 is as shown in Fig. 1, and assuming further the bias and control voltages are such that the condition of 90 degrees firing angle exists, then the sum of the induced voltages across the alternating-control windings 38 and 40 is as represented by a curve 52. That is, when the curve 50 goes positive, the current flows from the upper side of the source 28 through the load winding 20, the self-saturating rectifier 24, the rectifier 31, the load 30, and the rectifier 31, to the lower side of the source 28, as shown. Such an action drives the magnetic core member 16 to positive saturation and in doing so induces a voltage across the alternating-current control winding 38. During this same half-cycle of operation the flux level in the magnetic core member 18 is reset to a level as determined by the combined action of the bias winding 34 and the alternating-current control winding 40. This, in turn, induces a voltage across the alternating-current control winding 40 which aids the voltage induced across the alternating-current control winding 38. When the magnetic core member 16 saturates at 90 degrees firing angle a short is produced across the load winding 22 and thus, the flux in the magnetic core member 18 cannot change further and therefore, no further voltage is induced across the alternating-current control winding 40 during the last portion of the first half-cycle of operation.

Once the magnetic core member 16 saturates at 90 degrees firing angle, current flows through the primary winding 42 of the transformer 14 to thereby induce a voltage as represented by a curve 54 across the secondary winding 44 of the transformer 14 during the second half of the first half-cycle of operation. During the first half-cycle of operation a voltage is induced across the secondary winding 48 of the transformer 12 as represented by a curve 56.

As can be seen from Fig. 3, the voltages induced across the alternating-current control windings 38 and 40 during the first 90 degrees of operation, as represented by the curve 52, are bucked out by the voltage appearing across the secondary winding 48 of the potential transformer 12, as represented by the curve 56. During operation from 90 to 180 degrees the voltage appearing across the secondary winding 44 of the potential transformer 14, as represented by the curve 54, is bucked out by the voltage appearing across the secondary winding 48 of the potential transformer 12, as represented by the curve 56. Thus, during the first half-cycle of operation, the induced voltage in the control circuit including the control windings 38 and 40 is bucked out by the action of the potential transformers 12 and 14. Therefore, a maximum gain is obtained for the magnetic amplifier 10. Further, the load windings 20 and 22 do not have to effect a supply of circulating current in the alternating-current control circuit including the control windings 38 and 40, and thus, the magnetic amplifier 10 can be cut off.

During the next half-cycle of operation, when the lower side of the alternating-current source 28, as shown, is at a positive polarity with respect to its upper side and the terminal 36 is at a positive polarity with respect to the terminal 36′, the voltages induced across the alternating-current control windings 38 and 40 are likewise bucked out by the action of the potential transformers 12 and 14.

During this second half-cycle of operation, the voltage induced across the alternating-current control winding 40 is produced by the current which flows from the lower side of the alternating-current source 28 through the secondary winding 42 of the transformer 14, the self-saturating rectifier 26, and the load winding 22, to the upper side of the source 28. The current flow through the load winding 22 effects a change in the flux level in the magnetic core member 18, to thereby induce a voltage across the alternating-current control winding 40. On the other hand, the voltage induced across the alternating-current control winding 38 during this second half-cycle of operation is brought about by the change in the flux level in the magnetic core member 16 as effected by the bias winding 32 and the alternating-current control winding 38 in resetting the flux level in the magnetic core member 16.

In Fig. 3, a curve 58 represents the sum of the induced voltage appearing across the alternating-current control windings 38 and 40 during operation from 180 to 270 degrees. During the second half-cycle of operation, the magnetic amplifier 10 fires at 270 degrees firing angle and a curve 60 represents the voltage appearing across the secondary winding 44 of the potential transformer 14 after the magnetic amplifier 10 has fired. From 180 to 270 degrees of operation the voltage across the secondary winding 48 of the potential transformer 12, as represented by a curve 62, bucks out the voltages induced across the alternating-current control windings 38 and 40, as represented by the curve 58. In operation, from 270 to 360 degrees the voltage appearing across the secondary winding 44 of the potential transformer 14, as represented by the curve 60, is bucked out by the voltage appearing across the secondary winding 48 of the potential transformer 12, as represented by the curve 62. Thus, during the second half-cycle of operation, the potential transformers 12 and 14 cooperate to buck out the voltages induced in the alternating-current circuit including the alternating-current control windings 38 and 40.

Figure 2:
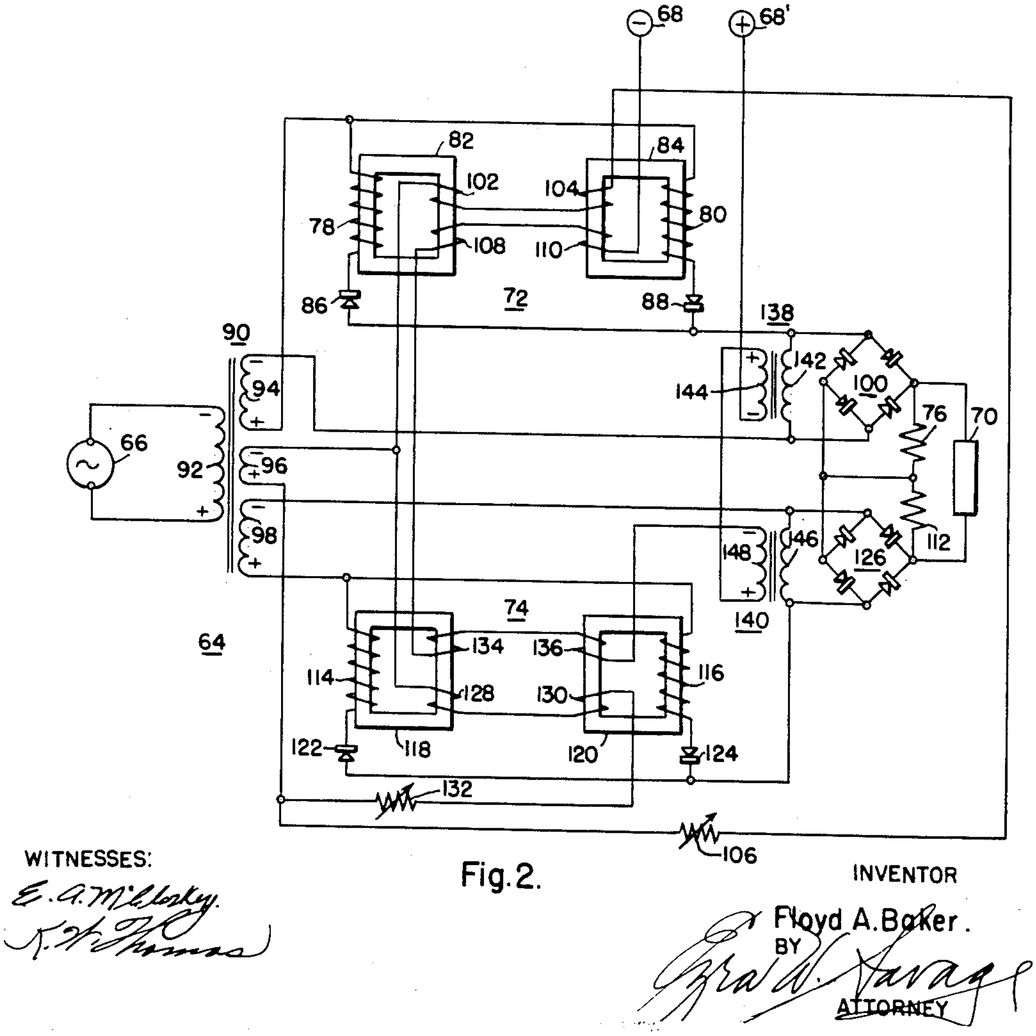
Fig. 2 is a schematic diagram of apparatus and circuits illustrating the application of this invention to a push-pull magnetic amplifier.

In Fig. 2, this invention is illustrated by reference to a push-pull magnetic amplifier 64 which is energized from an alternating-current source 66 and which is controlled in accordance with an amplitude modulated alternating voltage applied to control terminals 68 and 68′. In operation, the alternating control voltage applied to the terminals 68 and 68′ is of the same frequency as the output voltage of the alternating-current source 66 and is either in phase or 180 degrees out of phase with the output voltage of the source 66. By reversing the polarity of the voltage applied to the terminals 68 and 68′ the polarity of the voltage appearing across a load 70 is reversed.

In general, the push-pull magnetic amplifier 64 comprises two sections, 72 and 74. The sections 72 and 74 are so interconnected with the load 70 that the direct-current voltage appearing across the load 70 varies in accordance with the difference in the magnitude of the output currents of the sections 72 and 74. In this instance, the section 72 is a doubler-type magnetic amplifier and is connected to effect a current flow through a load resistor 76 in accordance with the magnitude of the current flow through its pair of load windings 78 and 80 which are disposed in inductive relationship with magnetic core members 82 and 84, respectively.

In order to produce self-saturation for the section 72, self-saturating rectifiers 86 and 88 are connected in series circuit relationship with the load windings 78 and 80, respectively. Energy for the load windings 78 and 80 of the section 72 is received from a potential transformer 90 having a primary winding 92 and secondary winding sections 94, 96 and 98. In particular, the secondary winding section 94 of the transformer 90 is interconnected with the load windings 78 and 80 and their associated self-saturating rectifiers 86 and 88 and with a full-wave dry-type rectifier 100 which functions to provide a flow of direct current through the load resistor 76.

For the purpose of biasing the magnetic core members 82 and 84 of the sections 72 to approximately half output when no voltage is applied to the control terminals 68 and 68′, bias windings 102 and 104 are disposed in inductive relationship with the magnetic core members 82 and 84, respectively. In practice, the bias windings 102 and 104 are so disposed on their respective magnetic core members 82 and 84 that when no current is flowing through the particular associated load winding 78 or 80 the current flow through the particular bias winding 102 or 104 effects a driving of the particular magnetic core member 82 or 84 away from positive saturation.

Energy for the bias windings 102 and 104 is received from the secondary winding section 96 of the potential transformer 90. The circuit for supplying such energy extends from the lower end of the secondary winding section 94, as shown, through an adjustable resistor 106, and the bias windings 104 and 102 of the section 72, to the upper end of the secondary winding section 96 of the transformer 90. The function of the adjustable resistor 106 is to change the flux level to which the bias windings 102 and 104 bias the magnetic core members 82 and 84, respectively.

In order to control the flux level to which the magnetic core members 82 and 84 are reset, alternating-current control windings 108 and 110 are disposed in inductive relationship with the magnetic core mmebers 82 and 84, respectively. The bias winding 102 and the alternating-current control winding 108 cooperate to determine the flux level to which the magnetic core member 82 is reset. On the other hand, the bias winding 104 and the alternating-current control winding 110 cooperate to determine the flux level to which the magnetic core member 84 is reset.

The section 74 of the push-pull magnetic amplifier 64 is also a doubler-type magnetic amplifier and is similar to the section 72. In operation, the section 74 produces a flow of direct-current through a load resistor 112 which current flow is proportinoal to the magnitude of the current flow through load windings 114 and 116 which are disposed in inductive relationship with magnetic core members 118 and 120, respectively. With zero control voltage applied to the terminals 68 and 68′ the voltages across the load resistors 76 and 112 are of equal magnitude, to thus produce zero voltage across the load 70. However, with a control voltage applied to the control terminals 68 and 68′ the magnitude of the voltage across the load 70 varies in accordance with the difference in the magnitude of the current flow through the pair of load windings 78 and 80 and the pair of load windings 114 and 116. For the purpose of producing self-saturation for the section 74, self-saturating rectifiers 122 and 124 are connected in series circuit relationship with the load windings 114 and 116, respectively. Energy for the load windings 114 and 116 is received from the secondary winding section 98 of the transformer 90. In particular, the lower end of the secondary winding section 98, as shown, is connected to the junction point of the load windings 114 and 116, while the upper end of the secondary winding section 98 is connected to the junction point of the self-saturating rectifiers 122 and 124 through a full-wave dry-type rectifier 126 and the load resistor 112. The function of the rectifier 126 is to produce a flow of direct-current through the load resistor 112.

The magnetic core members 118 and 120 of the section 74 are biased to approximately half output by current flow through the bias windings 128 and 130 which are disposed in inductive relationship with the magnetic core members 118 and 120, respectively. The bias windings 128 and 130 are so disposed on their respective magnetic core members 118 and 120 that current flow therethrough drives the magnetic core members 118 and 120 away from positive saturation when no current is flowing through their associated load windings 114 and 116, respectively.

Energy for the bias windings 128 and 130 is also received from the secondary winding section 96 of the transformer 90. The circuit for energizing the bias windings 128 and 130 of the section 74 extends from the lower end of the secondary winding section 96, as shown, through an adjustable resistor 132, and the bias windings 130 and 128, to the upper end of the secondary winding section 96 of the transformer 90. The function of the adjustable resistor 132 is to change the flux level to which the bias windings 128 and 130 bias their respective magnetic core members 118 and 120.

In order to control the flux level to which magnetic core members 118 and 120 of the section 74 are reset, when their associated load windings 114 and 116 have substantially no current therethrough, control windings 134 and 136 are disposed in inductive relationship with the magnetic core members 118 and 120, respectively.

In accordance with the teachings of this invention, electrical devices specifically potential transformers 138 and 140 are provided in order to buck out the voltages induced in the alternating-current control windings 108, 110, 134 and 136 during the operation of the push-pull magnetic amplifier 64. The potential transformer 138 comprises a primary winding 142 and a secondary winding 144, the primary winding 142 being connected to be responsive to the magnitude of the current flow through the pair of load windings 78 and 80 of the section 72. On the other hand, the potential transformer 140 comprises a primary winding 146 and a secondary winding 148, the primary winding 146 being connected to be responsive to the magnitude of the current flow through the pair of load windings 114 and 116 of the section 74.

Further, in accordance with the teaching of this invention, the alternating-current control windings 110 and 108, 134 and 136, and the secondary windings 148 and 144 of the transformers 140 and 138 are connected in series circuit relation with one another, the series circuit being connected to the control terminals 68 and 68′, the alternating-current control windings 10 and 108, 134 and 136 being responsive to the magnitude and polarity of the alternating control voltage applied to the control terminals 68 and 68′. By so interconnecting the secondary windings 144 and 148 with the alternating-current control windings 110, 108, 136 and 134, the voltages induced across these alternating-current control windings 108, 110, 134 and 136 are bucked out by the action of the transformers 138 and 140 as will be explained more fully hereinafter.

The operation of the apparatus illustrated in Fig. 2 will now be described by referring to Figs. 4 and 5. In Fig. 4 a graph illustrates the induced voltages appearing across the alternating-current control windings 110, 108, 134 and 136, and the voltages appearing across the secondary windings 144 and 148 of the transformers 138 and 140, when the alternating control voltage applied to the control terminals 68 and 68' is of zero magnitude. A curve 150 represents the output voltage from the alternating-current source 66.

With zero control voltage applied to the control terminals 68 and 68' the operation of the apparatus shown in Fig. 2 will now be described for each 90 degrees of operation for a total of 360 degrees. Assuming the polarity of the voltages across the secondary winding sections 94, 96 and 98 of the transformer 90 and the polarity of the alternating control voltage applied to the terminals 68 and 68' is as shown in Fig. 2, then the load winding 80 is energized by a circuit which extends from the lower end of the secondary winding section 94, as shown, through the load winding 80 of the section 72, the self-saturating rectifier 88, the rectifier 100, the load resistor 76, and the rectifier 100, to the upper end of the secondary winding section 94. The energization of the load winding 80 drives the magnetic core member 84 to saturation and in so doing effects a change in the flux in the magnetic core member 84 to thereby induce a voltage across the alternating-current control winding 110. This induced voltage is represented by a curve 152 as shown in Fig. 4. The magnetic core member 84 fires at 90 degrees since, as hereinbefore mentioned, the magnetic core member 84 is biased to approximately half output.

During this first 90 degrees of operation the load winding 116 of the section 74 is likewise energized and by a circuit which extends from the lower end of the secondary winding section 98 of the transformer 90 through the load winding 116, the self-saturating rectifier 124, the rectifier 126, the load resistor 112, and the rectifier 126, to the upper end of the secondary winding section 98. The energization of the load winding 116 of the section 74 effects a driving of the magnetic core member 120 to positive saturation thus effecting a change in the flux in the magnetic core member 120, to thereby induce a voltage across the alternating-current control winding 136. This latter induced voltage is represented by a curve 154. As can be seen from Fig. 4 the curves 152 and 154 are of opposite polarity and are such as to effectively cancel one another out.

During the first 90 degrees of operation the flux level in the magnetic core members 82 and 118 of the sections 72 and 74, respectively, is being reset by the action of the bias and control windings 102 and 108, and by the action of the bias and control windings 128 and 134, respectively. With the polarity of the control voltage applied to the terminals 68 and 68' as shown, the current flow through the bias winding 102 of the section 72 produces a magnetomotive force which opposes the magnetomotive force produced by the current flow through the associated alternating-current control winding 108. On the other hand, under these assumed conditions, the current flow through the bias winding 128 of the section 74 produces a magnetomotive force which aids the magnetomotive force produced by the current flow through the associated alternating-current control winding 134.

The resetting of the flux level in the magnetic core members 82 and 118 of the sections 72 and 74, respectively, induces voltages across the alternating-current control windings 108 and 134 of the sections 72 and 74, respectively. A curve 156 represents the voltage induced across the alternating-current control winding 108 and a curve 158 represents the voltage induced across the alternating-current control winding 134. As can be seen from Fig. 4, the curves 156 and 158 are of opposite polarity and are such as to effectively cancel one another out.

It is to be noted that the induced voltages across the alternating-current control windings 108 and 134 return to zero magnitude at 90 degrees of operation. The reason for this is that once the magnetic core members 84 and 120 are driven to positive saturation, the load windings 80 and 116 effect a short around the load windings 78 and 114, respectively, to thereby prevent a further change in the flux in the magnetic core members 82 and 118, respectively.

During the first 90 degrees of operation the current flow through the primary windings 142 and 146 of the transformers 138 and 140, respectively, is of substantially zero magnitude since the voltage is being absorbed by the magnetic core members 84 and 120 in driving these core members to positive saturation. Thus, as is shown by curves 160 and 162 the voltage across the secondary windings 144 and 148 of the transformers 138 and 140, respectively, is of zero magnitude during the first 90 degrees of operation. Therefore, as can be seen from Fig. 4, the voltages appearing across the alternating-current control windings 110, 108, 134 and 136 and the zero magnitude voltages appearing across the secondary windings 144 and148 add up to zero magnitude during the first 90 degrees of operation.

During the next 90 degrees of operation, from 90 to 180 degrees, no voltages are induced across the alternating-current control windings 110, 108, 134 and 136 since their respective magnetic core members are not changing their flux levels. However, once the magnetic core members 84 and 120 of the sections 72 and 74, respectively, saturate, then current flows through the primary windings 142 and 146 of the transformers 138 and 140, respectively, to thereby produce voltages across the secondary windings 144 and 148, as are represented by curves 164 and 166. It is to be noted that the curves 164 and 166 are of opposite polarity and are such as to cancel one another out. Therefore, during this second 90 degrees of operation, the voltages in the control circuit connected to the control terminals 68 and 68' add up to zero magnitude.

During the third 90 degrees of operation from 180 to 270 degrees, the magnetic core members 82 and 128 of the sections 72 and 74, respectively, are driven to positive saturation to thereby induce voltages across the alternating-current control windings 108 and 134, respectively, as illustrated by curves 170 and 172. During this same portion of the operation, the flux levels in the magnetic core members 84 and 120 are reset to thereby induce voltages across the control windings 110 and 136 as represented by curves 174 and 176, respectively. Of course, during this third 90 degrees of operation no voltage appears across the secondary windings 144 and 148 of the transformers 138 and 140, respectively, since the voltage is absorbed by the magnetic core members 82 and 118 in driving them to positive saturation.

During the fourth 90 degrees of operation, from 270 degrees to 360 degrees, no voltages are induced across the alternating-current control windings 110, 108, 134 and 136 since during this interval the flux is not being changed in their respective magnetic core members 84, 82, 118 and 120. However, since the magnetic core members 82 and 118 have been driven to positive saturation, current flows through the primary windings 142 and 146 of the transformers 138 and 140, respectively, to thereby produce voltages across the secondary windings 144 and 148 as represented by curves 178 and 180. However, the curves 178 and 180 are of opposite polarity and are such as to cancel one another out. Therefore, substantially no voltage appears across the series control circuit connected to the control terminals 68 and 68' during the fourth 90 degrees of operation under the assumption that zero control voltage is applied to the terminals 68 and 68'.

It is not necessary to provide the transformers 138 and 140 to buck out voltages induced across the alternating-current control windings 110, 108, 134 and 136 when no control voltage is applied to the control terminals 68 and 68'. However, as will be explained hereinafter, these electrical devices 138 and 140 are necessary in order to buck out such induced voltages when a control voltage is applied to the terminals 68 and 68'.

In Fig. 5 the graph illustrates the manner in which the transformers 138 and 140 effect a bucking out of the induced voltages across the alternating-current control windings 110, 108, 136 and 134 when an alternating voltage of a polarity as shown is applied to the control terminals 68 and 68'. It is assumed that the magnitude of the alternating voltage applied to the terminals 68 and 68' is such as to effect a firing of the section 72 at 60 degrees and a firing of the section 74 at 120 degrees. A curve 182 represents the output voltage of the alternating-current source 66.

Since it is assumed that the magnitude of the alternating control voltage applied to the terminals 68 and 68' is such as to effect a saturation of the section 72 at 60 degrees, curves 184 and 186 represent the voltages induced across the alternating-current control windings 110 and 108, respectively. On the other hand, since the section 74 does not saturate until 120 degrees, the curves 188 and 190 represent the voltages induced across the alternating-current control windings 134 and 136, respectively.

When the magnetic core member 84 of the section 72 saturates at 60 degrees, current begins to flow through the primary winding 142 of the transformer 138, to thereby produce a voltage across the secondary winding 144 from 60 to 180 degrees of operation. This latter voltage is represented by a curve 192. On the other hand, since the magnetic core member 120 is absorbing voltage for the first 120 degrees of operation, a voltage only appears across the secondary winding 148 of the transformer 140 during operation from 120 to 180 degrees. This voltage across the secondary winding 148 is represented by a curve 194. It is to be noted that the turns of the transformers 138 and 140 are such that the magnitude of the peak voltage produced across either the secondary winding 144 or the secondary winding 148 is equal to the sum of the magnitudes of the peak voltages induced across the alternating-current control windings 134 and 136. Therefore, as can be seen from Fig. 5, the sum of the induced voltages appearing across the alternating-current control windings 110, 108, 134 and 136 and the voltages appearing across the secondary windings 144 and 148 of the transformers 138 and 140, respectively, add up to zero magnitude during each degree of operation for the first 180 degrees of operation.

During the next 180 degrees of operation, from 180 to 360 degrees, the polarity of the various voltages induced across the alternating-current control windings 108, 110, 134 and 136, and the voltages produced across the secondary windings 144 and 148 is reversed, however, otherwise the operation of the apparatus shown in Fig. 2 from 180 to 360 degrees is similar to that hereinbefore described for the first 180 degrees of operation. Therefore, a further description is deemed unnecessary. However, it is to be noted that during the last 180 degrees of operation from 180 degrees to 360 degrees, the voltages induced across the alternating-current control windings 110, 108, 134 and 136 and the voltages across the secondary windings 144 and 148 add up to zero magnitude at all points of operation. Therefore, a maximum of gain is obtained for the push-pull magnetic amplifier 64. Further, the magnetic amplifier 64 requires no quiescent input signal for a null output. That is, the alternating-current source 66 does not have to supply energy for the circulation of currents in the control circuit connected to the control terminals 68 and 68'.

Since certain changes may be made in the above apparatus and circuits and different embodiments of the invention could be made without departing from the spirit and scope thereof, it is intended that all matter contained in the above description or shown in the accompanying drawings shall be interpreted as illustrative and not in a limiting sense.

I claim as my invention:

1. In a magnetic amplifier constructed to be energized from an alternating-current source and controlled in accordance with an alternating voltage so as to supply energy to a load, the combination comprising, magnetic core means, a pair of load windings disposed in inductive relationship with the magnetic core means, circuit means for so interconnecting the pair of load windings with the load and with the alternating-current source that the load windings are alternately energized, a transformer having an input and an output, the input of the transformer being connected to be responsive to the current flow through the pair of load windings, another transformer having an input and an output, the input of said another transformer being such as to be interconnected with the alternating-current source, a control winding disposed in inductive relationship with the magnetic core means, and other circuit means for connecting the outputs of said transformers and the control winding in series circuit relationship with one another and for rendering said series circuit responsive to said alternating voltage, so that the voltage induced in the said series circuit is bucked out by the output voltage of the said transformers.

2. In a magnetic amplifier constructed to be energized from an alternating-current source and controlled in accordance with an alternating voltage so as to supply energy to a load, the combination comprising, magnetic core means, a pair of load windings disposed in inductive relationship with the magnetic core means, circuit means for so interconnecting the pair of load windings with the load and with the alternating-current source that the load windings are alternately energized, an electrical device having an input and an output, the input of the electrical device being connected to be responsive to the current flow through the pair of load windings, another electrical device having an input and an output, the input of said another electrical device being such as to be interconnected with the alternating-current source, a control winding disposed in inductive relationship with the magnetic core means, and other circuit means for connecting the outputs of said electrical devices and the control winding in series circuit relationship with one another and for rendering said series circuit responsive to said alternating voltage, so that the voltage induced in the said series circuit is bucked out by the output voltages of the said electrical devices.

3. In a magnetic amplifier constructed to be energized from an alternating-current source and controlled in accordance with an alternating voltage so as to supply energy to a load, the combination comprising, magnetic core means, a pair of load windings disposed in inductive relationship with the magnetic core means for so interconnecting the pair of load windings with the load and with the alternating-current source that the load windings are alternately energized, a transformer having a primary winding and a secondary winding, the primary winding being connected to be responsive to the current flow through the pair of load windings, another transformer having a primary winding and a secondary winding, the primary winding of said another transformer being connected to be responsive to the alternating-current source, a control winding disposed in inductive relationship with the magnetic core means, and other circuit means for connecting said secondary windings and the control winding in series circuit relationship with one another and for rendering said series circuit responsive to said alternating voltage, so that the voltage induced in the said series circuit is bucked out by the voltages across the said secondary windings.

4. In a push-pull magnetic amplifier constructed to be energized from an alternating-current source and controlled in accordance with an alternating voltage so as to supply energy to a load, the combination comprising, two sections, each section including magnetic core means, a pair of load windings disposed in inductive relationship with respect to the magnetic core means, and a control winding disposed in inductive relationship with respect to the magnetic core means, circuit means for so interconnecting both pairs of load windings with the load and with the alternating-current source that the voltage across the load varies in accordance with the difference in the magnitude of the current flow through the two pairs of load windings, a transformer having an input and an output, the input of the transformer being connected to be responsive to the current flow through one of said two pairs of load windings, another transformer having an input and an output, the input of said another transformer being connected to be responsive to the current flow through the other of the two pairs of load windings, and other circuit means for connecting the outputs of said transformers and said control windings in series circuit relationship with one another and for rendering said series circuit responsive to said alternating voltage, so that the voltage induced in the said series circuit is bucked out by the output voltages of the said transformers.

5. In a push-pull magnetic amplifier constructed to be energized from an alternating-current source and controlled in accordance with an alternating voltage so as to supply energy to a load, the combination comprising, two sections, each section including magnetic core means, a pair of load windings, a control winding and a bias winding disposed in inductive relationship with the magnetic core means, the bias windings being connected to be energized from the alternating-current source, circuit means for so interconnecting both pairs of load windings with the load and with the alternating-current source that the voltage across the load varies in accordance with the difference in the magnitude of the current flow through the two pairs of load windings, a transformer having an input and an output, the input of the transformer being connected to be responsive to the current flow through one of said two pairs of load windings, another transformer having an input and an output, the input of said another transformer being connected to be responsive to the current flow through the other of the two pairs of load windings, and other circuit means for connecting the outputs of said transformers and said control windings in series circuit relationship with one another and for rendering said series circuit responsive to said alternating voltage, so that the voltage induced in the said series circuit is bucked out by the output voltages of the said transformers.

6. In a push-pull magnetic amplifier constructed to be energized from an alternating-current source and controlled in accordance with an alternating voltage so as to supply energy to a load, the combination comprising, two sections, each section including magnetic core means and a pair of load windings and a control winding disposed in inductive relationship with respect to the magnetic core means, circuit means for so interconnecting the two pairs of load windings with the load and with the alternating-current source that the voltage across the load varies in accordance with the difference in the magnitude of the current flow through the two pairs of load windings, a transformer having a primary winding and a secondary winding, the primary winding being connected to be responsive to the current flow through one of said two pairs of load windings, another transformer having a primary winding and a secondary winding, the primary winding of said another transformer being connected to be responsive to the current flow through the other of the said two pairs of load windings and other circuit means for connecting said control windings and said secondary windings in series circuit relationship with one another and for rendering said series circuit responsive to said alternating voltage, so that the voltage induced in the said series circuit is bucked out by the voltages across the said secondary windings.

7. In a push-pull magnetic amplifier constructed to be energized from an alternating-current source and controlled in accordance with an alternating voltage so as to supply energy to a load, the combination comprising, two sections, each section including magnetic core means, and a pair of load windings, a control winding and a bias winding disposed in inductive relationship with the magnetic core means, the bias windings being connected to be energized from the alternating-current source, circuit means for so interconnecting the two pairs of load windings with the load and with the alternating-current source that the voltage across the load varies in accordance with the difference in the magnitude of the current flow through the two pairs of load windings, a transformer having a primary winding and a secondary winding, the primary winding being connected to be responsive to the current flow through one of said two pairs of load windings, another transformer having a primary winding and a secondary winding, the primary winding of said another transformer being connected to be responsive to the current flow through the other of the said two pairs of load windings, and other circuit means for connecting said control windings and said secondary windings in series circuit relationship with one another and for rendering said series circuit responsive to said alternating voltage, so that the voltage induced in the said series circuit is bucked out by the voltages across the said secondary windings.

8. In a push-pull magnetic amplifier constructed to be energized from an alternating-current source and controlled in accordance with an alternating voltage so as to supply energy to a load, the combination comprising, two sections, each section including two magnetic core members each of which has disposed in inductive relationship therewith a load winding, a control winding and a bias winding, the bias windings being connected to be energized from the alternating-current source, circuit means for so interconnecting the load windings with the load and with the alternating-current source that the voltage across the load varies in accordance with the difference in the magnitude of the current flow through the load windings of one of the two sections and the current flow through the load windings of the other of the two sections, a transformer having a primary winding and a secondary winding, the primary winding being connected to be responsive to the current flow through the load windings of said one of the two sections, another transformer having a primary winding and a secondary winding, the primary winding of said another transformer being connected to be responsive to the current flow through the load windings of said other of the two sections, and other circuit means for connecting said control windings and said secondary windings in series circuit relationship with one another and for rendering said series circuit responsive to said alternating voltage, so that the voltage induced in the said series circuit is bucked out by the voltages across the said secondary windings.

No references cited.